(12) United States Patent
Harman et al.

(10) Patent No.: US 6,990,267 B2
(45) Date of Patent: Jan. 24, 2006

(54) MOVING FIBER OPTICAL SWITCH

(75) Inventors: Murray R. Harman, Ottawa (CA);
Stephen G. Harman, Ottawa (CA)

(73) Assignee: Luminos Industries Ltd., Ottawa (CA)

( * ) Notice: Subject to any disclaimer, the term of this patent is extended or adjusted under 35 U.S.C. 154(b) by 166 days.

(21) Appl. No.: 10/633,389

(22) Filed: Aug. 4, 2003

(65) Prior Publication Data
US 2004/0022478 A1 Feb. 5, 2004

Related U.S. Application Data

(60) Provisional application No. 60/400,706, filed on Aug. 5, 2002.

(51) Int. Cl.
*G02B 6/26* (2006.01)
*G02B 6/42* (2006.01)

(52) U.S. Cl. ............................ 385/22; 385/16; 385/17; 385/20; 385/21; 385/23; 385/25; 385/40; 385/50; 385/52

(58) Field of Classification Search ............ 385/14–16, 385/20–23, 39–42, 52, 55, 57
See application file for complete search history.

(56) References Cited

U.S. PATENT DOCUMENTS

| | | | | |
|---|---|---|---|---|
| 4,610,504 A | * | 9/1986 | Thurenius et al. ............ | 385/20 |
| 4,645,294 A | * | 2/1987 | Oguey et al. ................ | 385/140 |
| 4,759,597 A | * | 7/1988 | Lemonde ..................... | 385/22 |
| 4,834,488 A | * | 5/1989 | Lee ............................. | 385/57 |
| 4,896,935 A | * | 1/1990 | Lee ............................. | 385/22 |
| 4,911,520 A | * | 3/1990 | Lee ............................. | 385/16 |
| 5,078,514 A | * | 1/1992 | Valette et al. ................ | 385/20 |
| 5,239,599 A | * | 8/1993 | Harman ....................... | 385/16 |
| 5,278,692 A | * | 1/1994 | Delapierre ................... | 359/236 |
| 5,727,099 A | * | 3/1998 | Harman ....................... | 385/52 |
| 5,757,991 A | * | 5/1998 | Harman ....................... | 385/16 |
| 6,044,186 A | * | 3/2000 | Chang et al. ................ | 385/23 |
| 6,144,782 A | * | 11/2000 | Takahashi ................... | 385/20 |
| 6,169,826 B1 | * | 1/2001 | Nishiyama et al. ........... | 385/22 |
| 6,385,365 B1 | * | 5/2002 | Rosete et al. ................ | 385/23 |
| 6,738,539 B2 | * | 5/2004 | Hagood et al. .............. | 385/16 |
| 2003/0123787 A1 | * | 7/2003 | Bona et al. .................. | 385/17 |
| 2004/0184720 A1 | * | 9/2004 | Kubby ........................ | 385/22 |

* cited by examiner

*Primary Examiner*—Frank G. Font
*Assistant Examiner*—Ryan Lepisto
(74) *Attorney, Agent, or Firm*—David J. French (57) ABSTRACT

A moving fiber optical switch of the type having two opposed supports carrying optical fibers with a gap between the fiber ends, with at least one of the supports being flexibly mounted for pivotal movement relative to the other support, and in which:
(1) an actuator means, which provides pivotal movement of one or both supports between two orientations corresponding to first and second relative positions of the fiber supports, is connected to a connecting member or housing by means of a flexure;
(2) the switch has means for adjusting the length of the gap between the fiber ends; and
(3) the switch has means for adjusting the alignment of the optical fiber ends in a direction perpendicular to the movement provided by the pivotal movement of the flexibly mounted support or supports.

21 Claims, 6 Drawing Sheets

MOVING FIBER OPTICAL SWITCH

This application claims the benefit of Provisional Application No. 60/400,706, filed Aug. 5, 2002.

BACKGROUND OF THE INVENTION

1. Field of the Invention

The present invention relates to an optical switch of the moving fiber type.

2. Prior Art

A well known type of switch for optical fiber circuits is the moving fiber type, where two fiber portions are fixed to opposed fiber supports separated by a gap, the fiber portions extending along a fiber axis and having opposed fiber ends separated by a fiber gap. One or both supports are movable between a first position in which the fiber ends are aligned, so that light can cross the fiber gap, and a second position in which the fiber ends are out of alignment.

Although some switches of this type have lenses, the most compact and energy efficient switches of this kind simply use a fiber gap between polished ends of the fibers. This means that the movable support or supports must be capable of very precise movement, which is preferably achieved by the use of a flexible mounting for each movable support. Examples of U.S. patents showing this type of construction are the following:

U.S. Pat. No. 5,239,599, issued Aug. 24, 1993,
U.S. Pat. No. 5,727,099, issued Mar. 10, 1998, and
U.S. Pat. No. 5,757,991, issued May 26, 1998;

All of these patents have Murray R. Harman as inventor.

In the later two patents, there is a symmetrical arrangement of opposed supports which are each flexibly mounted on a connecting member or housing, and which are each moved by a link connected to an operating means. In both cases the operating means is capable of pivotal movement relative to the optical fiber axis, and to the connecting member or housing, in order to cause relative movement between the fiber ends. In the '599 patent the operating means is a pivot member which is pivotally moved, about a shaft-like pivot, relative to a housing which connects the flexible mounts of the supports. In the '991 patent the connecting member which joins the flexible mounts of the supports is itself pivotal about a shaft, and the operating means here is, in effect, a stationary part of the switch which is connected to the supports by flexible links.

The '099 patent shows an example of a moving fiber switch in which only one of the supports is flexibly mounted.

It is usual for such switches to be made by fixing a single optical fiber along the surfaces of two supports and across the gap between them, and then cutting this fiber to form the fiber gap. If the fiber gap thus formed is larger than the ideal, it has in the past been difficult to adjust this. U.S. Pat. No. 4,759,597, which issued Jul. 26, 1988 to Lemonde, suggests a construction in which the gap is adjusted by use of a micro-manipulator holding a part of the switch, but when the gap has been adjusted this is fixed by welding parts of the switch together, after which no adjustment is possible.

SUMMARY OF THE INVENTION

The present invention provides a moving fiber switch which has features in common with the switches of the '599 and '991 patents. However, it is not limited to a switch having both the optical fiber supports with flexible mountings, but may have only one, as in the '099 patent. In common with the '599 and '991 patents, the switch of this invention has:

two opposed fiber supports spaced apart along an optical fiber axis, at least one of said supports being flexibly mounted for pivotal movement relative to the other support in direction normal to said optical fiber axis, at least one optical fiber portion fixed to each support and extending along said optical fiber axis and having opposed fiber ends forming a fiber gap, the supports having a first position at which said fiber ends are axially aligned, and a second position at which said fiber ends are held out of alignment, link means connected to said flexibly mounted support to move said flexibly mounted support pivotally relative to the other support, and actuator means for providing movement of the link means and capable of causing movement of the flexibly mounted support, so that the supports are moved between said first and second relative positions.

Preferably, both of the supports are flexibly mounted relative to a housing, as in the '599 and '991 patents, and the actuator means includes electromagnetic means for moving the link means. However, other actuating means such as piezo-electric means may also be used.

The switch of this invention has three improvements over the switches described in the aforesaid Harman patents, i.e.:

1. Where, as in the '599 and '991 patents, the actuator means provides relative pivotal movement of an operating member, which is connected to the link means, between two orientations corresponding to the first and second relative positions of the fiber supports, this operating member, instead of being connected to the connecting member or housing by a shaft or similar pivot, is connected thereto by means of a flexure. This means that the switch operates entirely with flexures, and has no sliding surfaces which can be subject to wear and friction. Preferably, the flexure means includes a pair of crossed cantilevers.

2. The switch has means for adjusting the gap between the fiber ends. This means that if, as is usual practice, the switch is made by placing one fiber along the fiber axis and fixing it onto the two opposed supports, and then cutting the fiber to form the fiber gap, this gap can be adjusted to what is best suited to the switch operation and is not limited by the kind of saw used to form the gap. Unlike with the Lemonde patent, the gap can be re-adjusted at any time.

This gap adjustment is achieved by having one of the supports mounted on a flexible mount which allows axial movement of the one support relative to the other support along the optical fiber axis, and adjustment means is provided for causing the axial movement so as to adjust the width of the gap.

3. The switch has means for adjusting the alignment of the optical fiber ends in a direction perpendicular to the movement provided by the pivotal movement of the flexibly mounted support or supports. This is particularly useful where one fiber end on one support needs to be aligned selectively with each of two fiber ends on the other support; the one fiber end can be adjusted so that its position achieves the best compromise alignment with the other two fiber ends.

This alignment is achieved by having a second of the fiber supports mounted on a housing by means of a flexible mount which allows tilting motion of this second support relative to a first support in a direction perpendicular to the movement provided by the pivotal movement of the second support, and wherein there are provided adjustment means, such as a screw, for causing this tilting movement and thereby adjusting the alignment of the optical fiber ends.

BRIEF DESCRIPTION OF THE DRAWINGS

A preferred embodiment of the invention will now be described by way of example with reference to the accompanying drawings, in which.

DETAILED DESCRIPTION

Figure 1:
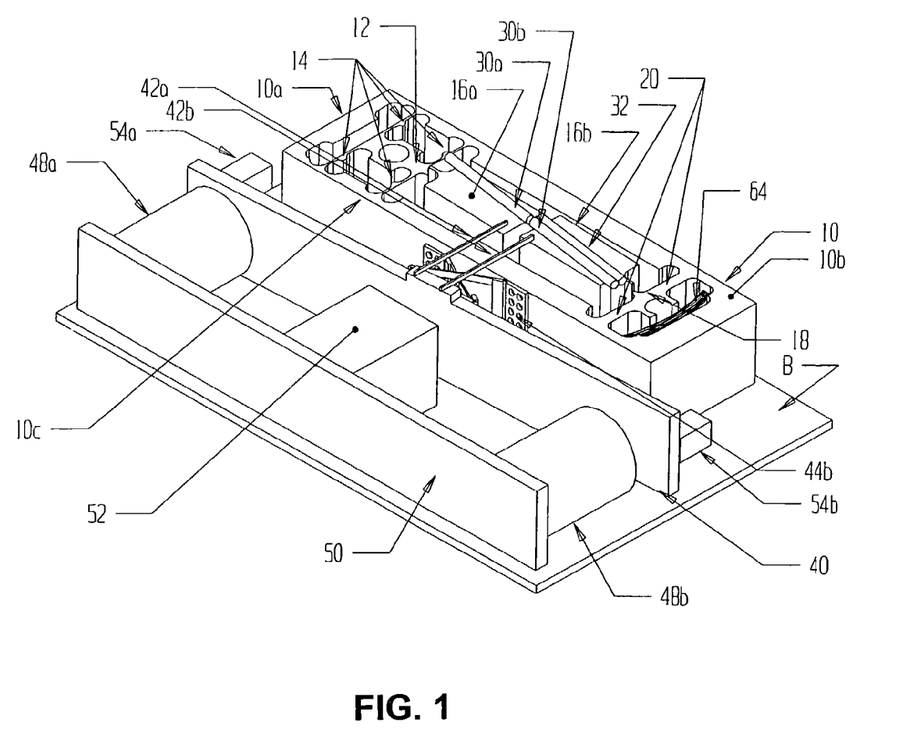
FIG. 1 shows a perspective view of the switch in a first position.
Figure 2:
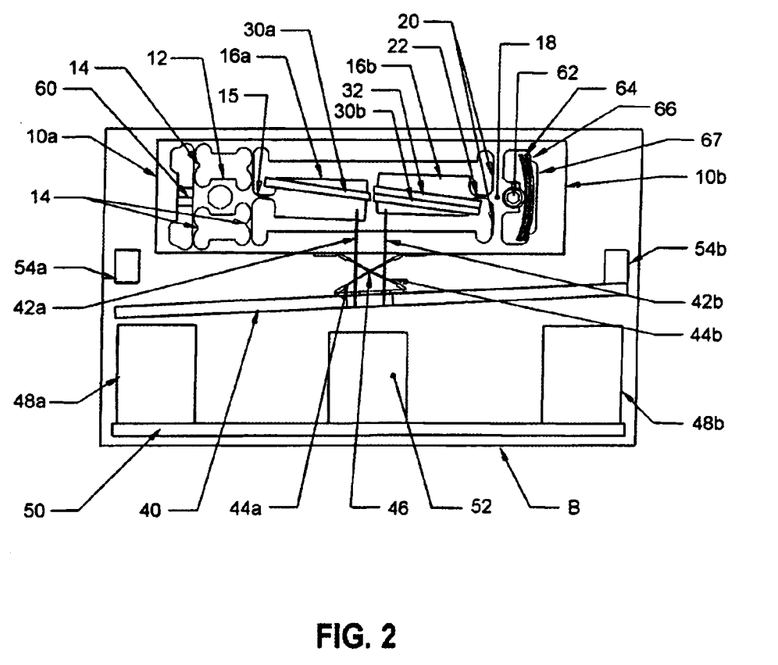
FIG. 2 shows a plan view of the switch in the same position.

Referring firstly to FIGS. 1 and 2, showing the whole switch, this comprises a metal housing 10 of generally rectangular form mounted on a base B. The housing is formed from an initially solid rectangular block in which cavities are cut through the depth of the block, to form the surrounding sides of the housing and integrally and flexibly connected movable parts of the switch within the housing sides. These latter parts include:

1. At a first end of the housing, a first base portion 12 connected to the sides of a first end portion 10a of the housing by two pairs of laterally extending flexures 14, each pair of flexures forming a parallelogram linkage on one side of the base portion 12. This first base portion 12 is in turn connected by a thin web 15 to a first fiber support 16a, the web 15 providing a flexible cantilever mounting which allows relatively easy motion of the support 16a in the lateral direction. The web 15 and all the other parts formed integrally with the housing have the full depth of the housing, so that web 15 has good stiffness in the vertical direction, i.e. perpendicular to the plane shown in FIG. 2. The flexures 14 allow some adjustment of this first base portion 12 longitudinally of the housing, i.e. they provide an axially movable flexible mount for the first support 16a for gap adjustment, as will be described below.

2. At the second end of the housing, a second base portion 18 is connected by a single pair of opposed flexures 20 extending laterally from the base to the sides of the second end portion 10b of the housing. These flexures 20 are relatively thick and stiff compared to the flexures 14, but are capable of small torsional deflection to provide a flexible mount allowing limited tilting of the second base portion 18 relative to the housing, as will also be further described below. The base portion 18 is connected by a thin flexible web 22, similar to web 15, to the second fiber support 16b which is disposed symmetrically opposite to the first support 16a, the adjacent ends of the supports being separated by a gap.

In forming the switch, fiber portions 30a and 30b are formed from a first optical fiber which is fixed to the supports 16a and 16b while it extends along an optical fiber axis which lies at a small angle, about 8°, to the common longitudinal axis of the supports, this fiber axis passing through the center of the gap between the supports. After being secured to the supports, this optical fiber is cut at the gap between the supports by a cut made perpendicularly to the common axis of the supports, and the adjacent ends of the two fiber portions 30a and 30b which form the fiber gap are polished to provide surfaces which are thus off-set 8° from the perpendicular to the fiber axis. These off-set fiber ends minimize back reflections within the fibers, in well known manner. In this preferred embodiment, an additional fiber portion 32 is attached to the support 16b closely beside and parallel to the fiber portion 30b. In some versions of the switch, another fiber portion may be attached to the first fiber support 16a beside fiber portion 30a.

Figure 3:
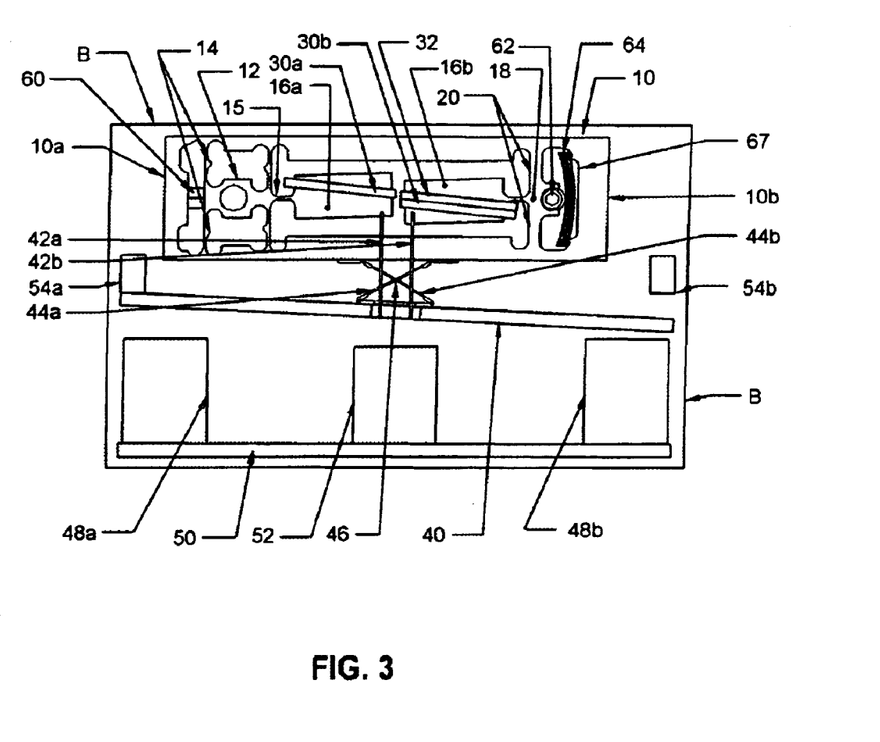
FIG. 3 shows a plan view of the switch in a second position.

FIGS. 1 to 3 also show the operating mechanism for the switch. This includes a pivotal operating member 40 or lever which is connected to the respective supports 16a and 16b by flexible links 42a and 42b. The operating member is pivotally mounted by being connected to the center of a side 10c of the housing by flexure means constituted by two pairs of crossed cantilevers 44a and 44b. Each cantilever pair has an upper and a lower portion which are superposed in the plan view, as in FIG. 2. These four hinge cantilevers have neither connection nor contact where they cross. The pivot point or fulcrum of this flexure is the crossing point 46 of the cantilevers in the center position of the operating member 40, i.e. aligned with the housing 10, this pivot point being spaced from and aligned with the fiber gap. The crossed cantilevers are all preferably oriented at a common angle of less than 45°, generally from 30 to 40°, relative to the longitudinal axis of the member 40. Use of this flexure system avoids any sliding joints, and attendant friction, in this switch. The use of the links 42a and 42b provides a kind of differential drive which nullifies the effect to thermal expansion of the links. Balanced differential drive also limits the effects of externally sourced acceleration.

The operating member 40 is in the form of a ferromagnetic armature, and is pivotally moved by electromagnetic actuator means in the form of two solenoids 48a, 48b mounted on a bracket 50 which is fixed to the base B which holds the housing 10, the solenoids being capable of attracting adjacent outer end portions of the ferromagnetic operating member 40. The bracket 50 also carries permanent magnet 52, which provides latching magnetization, to hold the operating member in its two extreme positions, in the absence of power being supplied to the solenoids, in which positions it is in contact with the stops 54a or 54b which determine the degree of movement of the member 40. The bracket 50 may also have magnets (not shown) which control the balance properties of the switch. Alternately the magnet shown as 52 may be laterally positioned, as required to adjust balance properties. The stops 54a and 54b are carried by base B by means allowing them to be precisely adjusted so that in the first position of member 40, which is shown in FIGS. 1 and 2 of the drawings, the links 42a, 42b hold the supports 16a, 16b, in a first deflected position with the fiber portions 30a and 30b aligned, whereas in the second position of member 40 shown in FIG. 3, the links hold the supports in a second deflected position with the fiber portion 30a aligned with the fiber portion 32. Since the stops 54a and 54b are precisely adjustable and are situated adjacent the outer end portions of the operating member 40, being 7 to 10 times as far from the pivot axis as are the links 42a and 42, both the actuating means and stops have a mechanical advantage in relation to the links 42a and 42b, and the movement of the supports 16a and 16b can be adjusted with great precision and is not much affected by wear on the stops.

FIGS. 2 and 3 also show an axially movable gap adjustment screw 60 at the first end portion 10a of the housing which can move the base portion 12 axially in order to adjust the gap between the fiber ends, and a vertically movable alignment adjustment screw 62 at the second end portion 10b of the housing which can adjust the support 16b vertically, relative to support 16a, in order to adjust the relative heights of the fiber ends.

Figure 4:
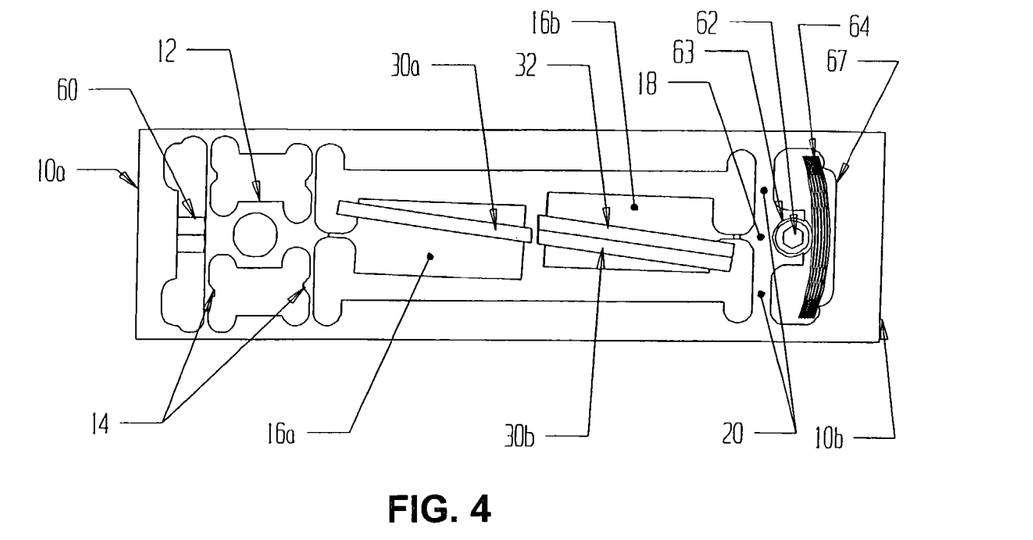
FIG. 4 shows parts of the switch in the first position, and with an initial gap as formed by cutting a single fiber.
Figure 5:
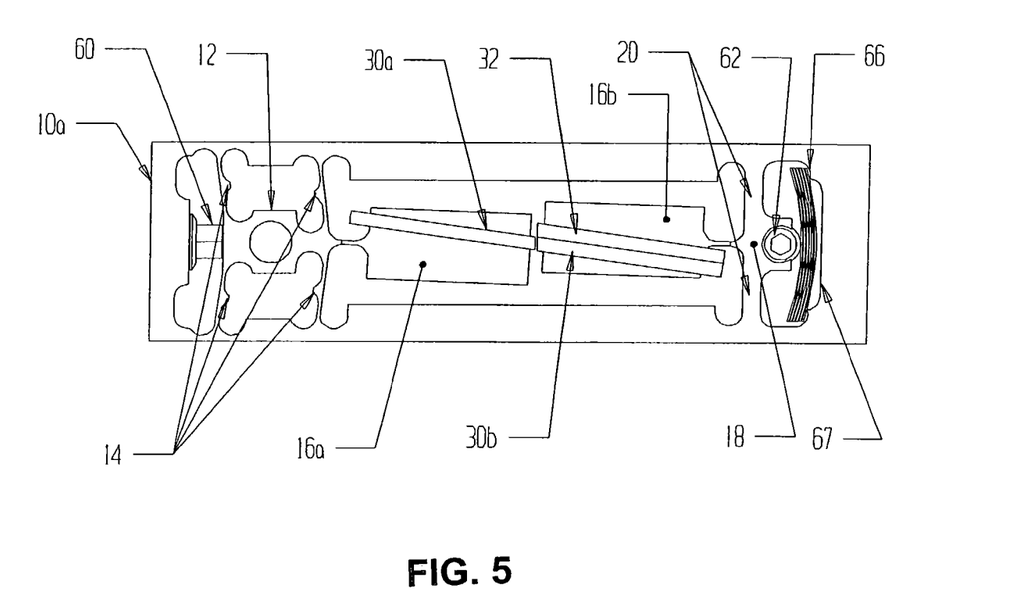
FIG. 5 shows the same parts as FIG. 4 but after adjustment of the gap.

Reference is now made to FIGS. 4 and 5 which illustrate the details of the gap adjustment, although the amount of movement is exaggerated by about 10 times for clarity. FIG. 4 shows the at rest position of the flexures 14 which connect the housing end portion 10a to the base portion 12, at which no pressure is being exerted by the screw 60, and where the gap between fiber ends is relatively large, as it would be after the gap has been created by sawing through a fiber and polishing the fiber ends. FIG. 5 shows the situation when the screw 60 has been turned to protrude outwards from the end of the housing, and has acted on base portion 12 to deflect the flexures 14 and to move the support 16a towards support 16b thus partly closing the gap. This provides a convenient way to have an optimum gap size even when the saw and/or polishing means is quite wide.

At the other end of the housing, the vertically movable adjustment screw 62 is shown movable in a bore 63 at the end of the base mounting 18 closest to the housing end 10b, and which is close to a leaf spring 64, this spring being a multi-section spring formed of many thin leafs, the spring having a height equivalent to the housing, and being located by two vertically extending ledges 66 on opposite sides of a recess 67 into which the spring is caused to bend. The bore 63 has an open side close to the lateral center of the spring 64, which allows an exposed side of the screw 62 to contact successively upper, central and lower portions of the spring as the screw is turned and moves down the bore. The pressure of the spring 64 against the screw 62, when in its upper or lower positions, exerts a torsional force on the flexures 20 thus tilting the base portion 18 and raising or lowering the end of the support 16b.

Figure 6:
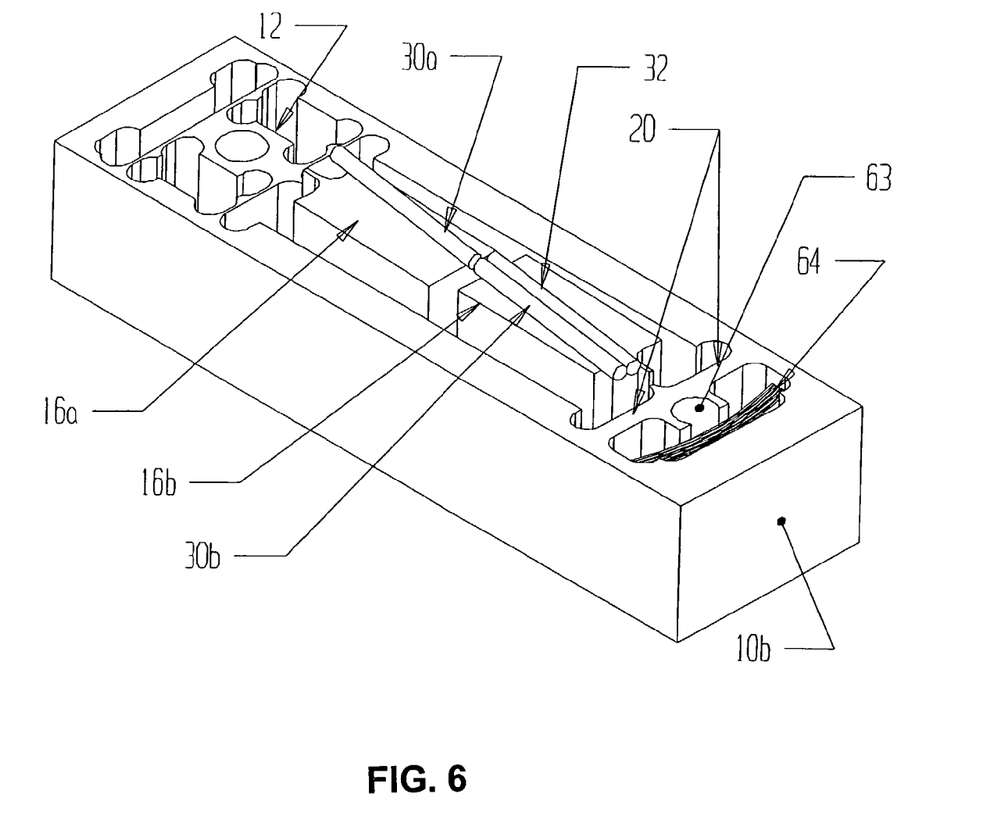
FIG. 6 shows a perspective view of parts of the switch in the first position.
Figure 7:
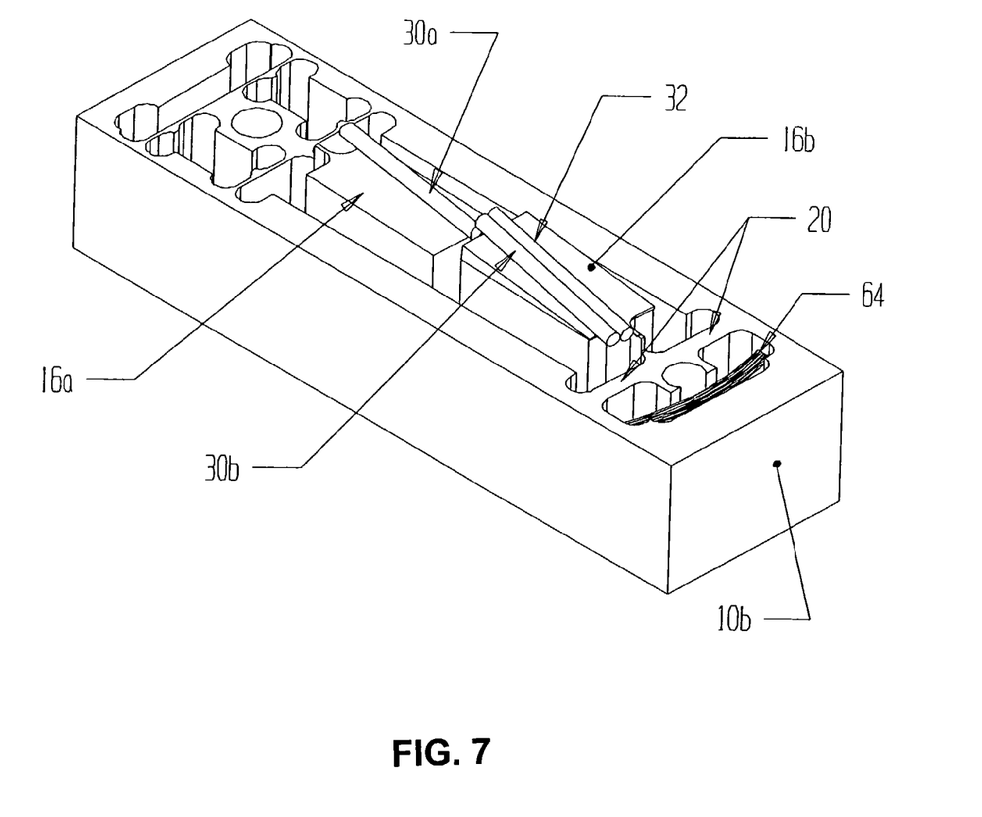
FIG. 7 shows the same parts as FIG. 6 but after an figure adjustment of alignment, which adjustment is exaggerated in this

The effect of this adjustment is illustrated in FIGS. 6 and 7. FIG. 6 corresponds to a vertically centered location of the screw 62, at which it is out of sight in this view; this drawing shows that here the vertical deflection of the support 16b is negligible. In FIG. 7 the support 16b is shown in an upwardly deflected condition achieved by moving the screw 62 down to its lowest position. In fact in this drawing the deflection of support 16b has been exaggerated by about 500 times for clarity; the actual amount of movement at the fiber end is about plus or minus one micron.

This height adjustment of one support relative to the other is important where the fibers have small mode field diameters, for example less than 9 microns, and especially where one or both supports has two fibers, as here. Height adjustment is required since although in theory the manner of fixing the two fiber portions 30a and 30b should ensure that the fiber ends have the same height, in practice the top surfaces of the supports, although lapped flat, may not be exactly co-planar. Also, without height adjustment, there is no easy way to ensure good alignment of fiber portion 30a with the third fiber portion 32, since the core of a fiber is not always accurately at its center. Alignment is important since transmission losses increase as the square of the mis- alignment. This height adjustment allows light passing through the switch to be monitored while the height of the support 16b is adjusted relative to support 16a so that each output fiber portion 30b and 32 can receive the same amount of light from fiber portion 30a when the switch is in the appropriate position; in other words it allows the height of support 16b to be set at the best compromise position relative to the cores of the two fiber portions 30b and 32.

The adjustments provided by this switch thus include a two-axis or quadrature alignment, where the height adjustment provides one axis and the adjustable stops 54a and 54b provide the other. In addition the gap between the fiber ends is adjustable so that, in this design, all three axes can be optimised to yield the lowest possible loss through the switch.

We claim:

1. A moving fiber optical switch, comprising:

two opposed fiber supports spaced apart along an optical fiber axis, at least one of said supports being flexibly mounted for pivotal movement relative to a housing carrying the other support, said movement occurring in direction normal to said optical fiber axis, at least one optical fiber portion fixed to each support and extending along said optical fiber axis and having opposed fiber ends forming a fiber gap, the supports having a first relative position at which said fiber ends are axially aligned, and a second relative position at which said fiber ends are held out of alignment, link means connected to said flexibly mounted support to move said flexibly mounted support pivotally relative to said housing and the other support, operating means connected to said link means and capable of pivotal movement relative to said housing and to the optical fiber axis, said pivotal movement occurring between two orientations, including a first orientation where the supports are in said first position, and a second orientation in which the supports are in the second position;

stop means cooperating with the operating means to define said two orientations, and actuator means for providing said relative pivotal movement of the operating means between said two orientations;

wherein said optical switch is characterized in that the relative pivotal movements between the operating means and the housing and between the operating means and the flexibly mounted support are both provided entirely by flexure means.

2. An optical switch according to claim 1, wherein both of said supports are flexibly mounted relative to said housing, and said link means includes link members connecting both of said supports to said operating means.

3. An optical switch according to claim 2, wherein said flexure means includes a pair of crossed cantilevers.

4. An optical switch according to claim 2, wherein said operating means are in the form of a ferromagnetic armature, and wherein said actuator means are electromagnetic.

5. An optical switch according to claim 1, wherein said operating means are in the form of a ferromagnetic armature, and wherein said actuator means are electromagnetic.

6. An optical switch according to claim 1, wherein one of said supports is mounted on a flexible mount which allows axial movement of said one support relative to the optical fiber axis, and wherein adjustment means is provided for causing said axial movement so as to adjust the axial width of said gap.

7. A moving fiber optical switch comprising:
two opposed fiber supports spaced apart along an optical fiber axis, at least one of said supports being flexibly mounted for pivotal movement relative to a housing carrying the other support, said movement occurring in direction normal to said optical fiber axis,
at least one optical fiber portion fixed to each support and extending along said optical fiber axis and having opposed fiber ends forming a fiber gap, the supports having a first relative position at which said fiber ends are axially aligned, and a second relative position at which said fiber ends are held out of alignment,
link means connected to said flexibly mounted support to move said flexibly mounted support pivotally relative to said housing and the other support,
operating means connected to said link means and capable of pivotal movement relative to said housing and to the optical fiber axis,
and actuator means for providing said relative pivotal movement of the operating means between two orientations, including a first orientation where the supports are in said first position, and a second orientation in which the supports are in the second position;
wherein said optical switch is characterized in that the relative pivotal movements between the operating means and the flexibly mounted support and between the operating means and the housing are provided entirely by flexure means,
and wherein said flexure means includes a pair of crossed cantilevers.

8. An optical switch according to claim 7, wherein said actuator means are electromagnetic.

9. A moving fiber optical switch, comprising:
two opposed fiber supports spaced apart along an optical fiber axis, at least one of said supports being flexibly mounted for pivotal movement relative to the other support in direction normal to said optical fiber axis,
at least one optical fiber portion fixed to each support and extending along said optical fiber axis and having opposed fiber ends forming a fiber gap, the supports having a first relative position at which said fiber ends are axially aligned, and a second relative position at which said fiber ends are held out of alignment,
link means connected to said flexibly mounted support to move said flexibly mounted support pivotally relative to said other support,
and actuator means for providing movement of said link means and capable of causing said pivotal movement of said flexibly mounted support, so that the supports move between said first and second relative positions;
said switch being characterized in that a first of said supports is mounted on a flexible mount which allows axial movement of the first support relative to the optical fiber axis, and wherein adjustment means is provided for causing said axial movement so as to adjust the axial width of said gap.

10. An optical switch according to claim 9, wherein said adjustment means is a screw.

11. An optical switch according to claim 10, wherein said optical switch includes a housing, and wherein said flexible mount connects a base portion of said first support to a first end portion of the housing, and wherein said screw is located at the end portion of the housing and is positioned to act on the base portion of the first support.

12. An optical switch according to claim 9, wherein a second of said supports is mounted on a housing by means of a flexible mount which allows tilting motion of said second support relative to a first support in a direction perpendicular to the movement provided by the pivotal movement of said flexibly mounted support, and wherein there are provided adjustment means for causing said tilting movement and thereby adjusting the alignment of the optical fiber ends.

13. A moving fiber optical switch comprising
two opposed fiber supports spaced apart along an optical fiber axis, at least one of said supports being flexibly mounted for pivotal movement relative to a housing carrying the other support, said movement occurring in direction normal to said optical fiber axis,
at least one optical fiber portion fixed to each support and extending along said optical fiber axis and having opposed fiber ends forming a fiber gap, the supports having a first relative position at which said fiber ends are axially aligned, and a second relative position at which said fiber ends are held out of alignment,
link means connected to said flexibly mounted support to move said flexibly mounted support pivotally relative to said housing and the other support,
operating means connected to said link means and capable of pivotal movement relative to said housing and to the optical fiber axis,
and actuator means for providing said relative pivotal movement of the operating means between two orientations, including a first orientation where the supports are in said first position, and a second orientation in which the supports are in the second position;
wherein said optical switch is characterized in that the relative pivotal movements between the operating means and the flexibly mounted support and between the operating means and the housing are both provided entirely by flexure means,
and wherein a second of said supports is mounted on said housing by means of a flexible mount which allows tilting motion of said second support relative to a first support in a direction perpendicular to the movement provided by the pivotal movement of said flexibly mounted support, and wherein there are provided adjustment means for causing said tilting movement and thereby adjusting the alignment of the optical fiber ends.

14. A moving fiber optical switch, comprising:
two opposed fiber supports spaced apart along an optical fiber axis, at least one of said supports being flexibly mounted on a housing for pivotal movement relative to the other support also mounted on said housing in direction normal to said optical fiber axis,
at least one optical fiber portion fixed to each support and extending along said optical fiber axis and having opposed fiber ends forming a fiber gap, the supports having a first relative position at which said fiber ends are axially aligned, and a second relative position at which said fiber ends are held out of alignment,
link means connected to said flexibly mounted support to move said flexibly mounted support pivotally relative to said housing and said other support,
and actuator means for providing movement of said link means and capable of causing movement of said flexibly mounted support, so that the supports move between said first and second relative positions;
said switch being characterized in that a second of said supports is mounted on said housing by means of a flexible mount which allows tilting motion of said second support relative to a first support in a tilting direction perpendicular to the movement provided by the pivotal movement of said flexibly mounted support, and wherein there are provided adjustment means for causing said tilting movement and thereby adjusting the alignment of the optical fiber end portions.

15. An optical fiber switch according to claim 14, wherein said adjustment means include a screw trapped between said flexible mount and an adjacent part of the housing, said screw being arranged to travel in said tilting direction to cause distortion of said flexible mount in such manner as to vary the tilt of the said second support.

16. An optical fiber switch according to claim 15, wherein said adjacent part of the housing is a leaf spring held at its sides and having a central portion capable of flexing towards the end of the housing.

17. A moving fiber optical switch, comprising:
two symmetrically opposed fiber supports spaced apart along an optical fiber axis, each of said supports being flexibly mounted for pivotal movement relative to a housing carrying the two supports, said movement occurring in direction transverse to said optical fiber axis,
at least one optical fiber portion fixed to each support and extending along said optical fiber axis and having opposed fiber ends forming a fiber gap, the supports having a first relative position at which said fiber ends are axially aligned, and a second relative position at which said fiber ends are held out of alignment,
link means connected to each said flexibly mounted support to move said flexibly mounted support pivotally relative to said housing and the other support,
operating means in the form of a lever connected to said link means and having a fulcrum positioned between the connections of the lever to the link means, said lever being capable of pivotal movement relative to said housing and to the optical fiber axis between two orientations, including a first orientation where the supports are in said first position, and a second orientation in which the supports are in the second position,
electromagnetic actuator means for providing said relative pivotal movement of the lever between said two orientations, and
stop means limiting movement of said lever to define said two orientations,
said actuator means and stop means operating on outer portions of said lever, which outer portions are situated outwardly from said link means so that said actuator and stop means have a mechanical advantage over the link means;
wherein said optical switch is characterized in that the relative pivotal movements between the operating means and the housing at said fulcrum, and between the operating means and the flexibly mounted support, are both provided entirely by flexure means.

18. An optical switch according to claim 17, wherein said flexure means at said fulcrum is provided by a pair of crossed cantilevers.

19. An optical switch according to claim 17, wherein said operating means is a ferromagnetic armature, and wherein said actuator means are electromagnetic.

20. An optical switch according to claim 17, wherein one of said supports is mounted on a flexible mount which allows axial movement of said one support relative to the optical fiber axis, and wherein adjustment means is provided for causing said axial movement so as to adjust the axial width of said gap.

21. An optical switch according to claim 17, wherein a second of said supports is mounted on said housing by means of a flexible mount which allows tilting motion of said second support relative to a first support in a direction perpendicular to the movement provided by the pivotal movement of said flexibly mounted support, and wherein there are provided adjustment means for causing said tilting movement and thereby adjusting the alignment of the optical fiber ends.

* * * * *